United States Patent
Lee

(10) Patent No.: US 9,519,832 B2
(45) Date of Patent: Dec. 13, 2016

(54) PARKING CAMERA SYSTEM AND METHOD OF DRIVING THE SAME

(75) Inventor: Sangyong Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 320 days.

(21) Appl. No.: 14/116,679

(22) PCT Filed: May 9, 2012

(86) PCT No.: PCT/KR2012/003626
§ 371 (c)(1),
(2), (4) Date: Nov. 8, 2013

(87) PCT Pub. No.: WO2012/153978
PCT Pub. Date: Nov. 15, 2012

(65) Prior Publication Data
US 2014/0085474 A1    Mar. 27, 2014

(30) Foreign Application Priority Data

May 9, 2011  (KR) .................. 10-2011-0043658

(51) Int. Cl.
*B62D 15/02* (2006.01)
*G06K 9/00* (2006.01)
*B60R 1/00* (2006.01)

(52) U.S. Cl.
CPC ............ *G06K 9/00791* (2013.01); *B60R 1/00* (2013.01); *B62D 15/0275* (2013.01); *B60R 2300/302* (2013.01); *B60R 2300/303* (2013.01); *B60R 2300/305* (2013.01)

(58) Field of Classification Search
None
See application file for complete search history.

(56) References Cited

U.S. PATENT DOCUMENTS

| 8,237,795 | B2* | 8/2012 | Mizusawa | B60R 1/00 348/148 |
| 2003/0197660 | A1* | 10/2003 | Takahashi | G08G 1/168 345/7 |
| 2004/0153243 | A1 | 8/2004 | Shimazaki et al. | |
| 2007/0239357 | A1* | 10/2007 | Mori | B62D 15/028 701/469 |
| 2008/0129539 | A1* | 6/2008 | Kumon | B60R 1/00 340/901 |

(Continued)

FOREIGN PATENT DOCUMENTS

| EP | 2 233 359 A1 | 9/2010 |
| JP | 2004-123058 A | 4/2004 |

(Continued)

*Primary Examiner* — Jayanti K Patel
*Assistant Examiner* — Reza Aghevli
(74) *Attorney, Agent, or Firm* — Birch, Stewart, Kolasch & Birch, LLP

(57) ABSTRACT

A parking camera system and a method of driving the same includes a plurality of cameras equipped with a vehicle, an image synthesizer for synthesizing images photographed by the plurality of cameras, and an estimated travel trajectory generating and overlaying processor for generating an estimated travel trajectory of the vehicle by receiving steering angle information of the vehicle, and synthesizing the estimated travel trajectory of the vehicle with the images synthesized by the image synthesizer.

19 Claims, 4 Drawing Sheets

(56) References Cited

U.S. PATENT DOCUMENTS

| | | | | |
|---|---|---|---|---|
| 2008/0198226 A1* | 8/2008 | Imamura | ............ | G06K 9/00805 |
| | | | | 348/148 |
| 2009/0091475 A1* | 4/2009 | Watanabe | .............. | B60Q 9/005 |
| | | | | 340/932.2 |
| 2010/0289632 A1* | 11/2010 | Seder | .................... | G01S 13/723 |
| | | | | 340/436 |
| 2010/0292886 A1* | 11/2010 | Szczerba | .............. | G01C 21/365 |
| | | | | 701/31.4 |
| 2011/0095910 A1 | 4/2011 | Takano | | |

FOREIGN PATENT DOCUMENTS

| | | | |
|---|---|---|---|
| JP | 2004-243835 A | 9/2004 | |
| JP | 2004-284370 A | 10/2004 | |
| JP | 2006-298195 | * 11/2006 | ......... B62D 15/0275 |
| JP | 2006-298195 A | 11/2006 | |
| TW | M353849 U | 4/2009 | |
| WO | WO 2009/081519 A1 | 7/2009 | |

* cited by examiner

PARKING CAMERA SYSTEM AND METHOD OF DRIVING THE SAME

TECHNICAL FIELD

The teachings in accordance with the exemplary embodiments of this invention relate generally to a parking camera system and a method of driving the same.

BACKGROUND ART

Concomitant with development trends in vehicles, the vehicles are recently provided with stability and various other conveniences, in addition to basic traveling performances, and a plurality of sensors are applied in and out of a vehicle body to enable detection of a scene and an environment of an area around the vehicle while sitting inside the vehicle.

Most of the drivers have difficulty in parking. That is, it is difficult to park due to stolidity to distance of adjacent objects during parking of a vehicle. Furthermore, the parking becomes more difficult due to gradually narrowing parking lots caused by increased number of vehicles. Especially, the difficulty in parking looms larger to novice drivers due to failure to measure an adequate distance to objects resultant from inexperience.

The problem is that even an experienced driver can hit another vehicle or a wall existing in front of or at rear of his or her vehicle due to failure to measure a distance to obstructive objects during parking in a narrow space, resulting in property damage. Particularly, in case of reversely driving a vehicle, a driver even cannot grasp a presence of an object let alone a distance measurement, which frequently happens to a novice driver and an experienced driver as well.

DISCLOSURE OF INVENTION

Technical Problem

The present invention is directed to solve the aforementioned problems, disadvantages or shortcomings, and to provide a parking camera system capable of recognizing an obstructive object present in front of a vehicle during vehicle parking by viewing images of substantially all directions of the vehicle, and performing an accurate parking while viewing an estimated travel trajectory of the vehicle, and a method of driving the same.

Technical problems to be solved by the present invention are not restricted to the above-mentioned, and any other technical problems not mentioned so far will be clearly understood from the following description by skilled in the art.

Solution to Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a parking camera system, the system including: a plurality of cameras equipped with a vehicle; an image synthesizer for synthesizing images photographed by the plurality of cameras; and an estimated travel trajectory generating and overlaying processor for generating an estimated travel trajectory of the vehicle by receiving steering angle information of the vehicle, and synthesizing the estimated travel trajectory of the vehicle with the images synthesized by the image synthesizer.

Preferably, the plurality of cameras includes a first camera installed in front of the vehicle, a second camera installed at a rear of the vehicle, a third camera installed at a left side of the vehicle, and a fourth camera installed at a right side of the vehicle.

Preferably, the parking camera system further includes a memory stored with a parking guide line of the vehicle, a parking area image and a vehicle image.

Preferably, the memory is further stored with a parking mode image, a parking direction image and a warning phrase image.

Preferably, the image synthesizer synthesizes at least one or more of the parking guide line, the parking area image and vehicle image stored in the memory with images photographed by the cameras.

Preferably, the estimated travel trajectory generating and overlaying processor is connected to a display unit displaying an ambient image of vehicle synthesized with the estimated travel trace of the vehicle.

Preferably, the ambient images of vehicle synthesized with the estimated travel trajectory of the vehicle are displayed about the vehicle image on the display unit, wherein an image photographed by the first camera is positioned at the front of the vehicle image, an image photographed by the second camera is positioned at the rear of the vehicle image, an image photographed by the third camera is positioned at the left side of the vehicle image, and an image photographed by the fourth camera is positioned at the right side of the vehicle image.

Preferably, the estimated travel trajectory of the vehicle is displayed on the display unit in the form of a polygon or a direction indication.

Preferably, the estimated travel trajectory is displayed on the display unit changed in real time in response to change of a steering angle of vehicle.

Preferably, the estimated travel trajectory generating and overlaying processor is such that the steering wheel of the vehicle calculates coordinates turned to a predetermined steering angle between a maximum steering angle and a minimum steering angle, and dotted lines connecting the coordinates generate the estimated travel trajectory of the vehicle.

In another general aspect of the present invention, there is provided a method of driving a parking camera system, the method including: synthesizing images photographed by a plurality of cameras equipped with a vehicle; generating an estimated travel trajectory of the vehicle by receiving steering angle information of the vehicle; and synthesizing the estimated travel trajectory with the synthesized images.

Preferably, the method is further including displaying the synthesized images and an image synthesized with the estimated travel trajectory on a display unit, after the step of synthesizing the estimated travel trajectory with the synthesized images.

Preferably, the estimated travel trajectory of the vehicle is displayed on the display unit by being changed in real time in response to change of a steering angle of vehicle.

Preferably, the images synthesized with images photographed by the plurality of cameras are images of substantially all-around views.

In still another general aspect of the present invention, there is provided a method of driving a parking camera system, the method including: selecting a parking image from images of all-around views of a vehicle; and combining an estimated travel trajectory of a vehicle generated by steering angle information of the vehicle with a parking area of the all-around views of the vehicle.

Preferably, the all-around views of the vehicle are made by synthesizing images photographed by a plurality of cameras equipped with the vehicle and are substantially all-around views of the vehicle.

Preferably, the step of selecting the parking image from images of all-around views of the vehicle is further including selecting a parking mode from the all-around views of the vehicle.

Preferably, the parking mode includes a parallel parking and a right angle parking.

Preferably, in case the parking area is selected, the selected parking area is combined with parking guide line information.

Preferably, colors of estimated travel trajectory of vehicle are different when the estimated travel trajectory matches the parking guide line and when the estimated travel trajectory does not match the parking guide line.

Advantageous Effects of Invention

The parking camera system and method of driving the same according to the present invention thus configured have advantageous effects in that a driver can view images of substantially all-around views of a vehicle to enable the driver to recognize an obstructive object present in front of a vehicle during vehicle parking, and perform an accurate parking while viewing an estimated travel trajectory of the vehicle.

The parking camera system and method of driving the same according to the present invention thus configured have further advantageous effects in that a driver can adjust a steering wheel to prevent an estimated travel trajectory of the vehicle from deviating from a parking guide line and a parking area of the vehicle, in a case the estimated travel trajectory of the vehicle deviates from the parking guide line and the parking area of the vehicle, thereby reducing inconveniences and time loss resultant from parking failure.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Now, exemplary embodiment of the present invention will be described in detail with reference to the accompanying drawings.

Figure 1:
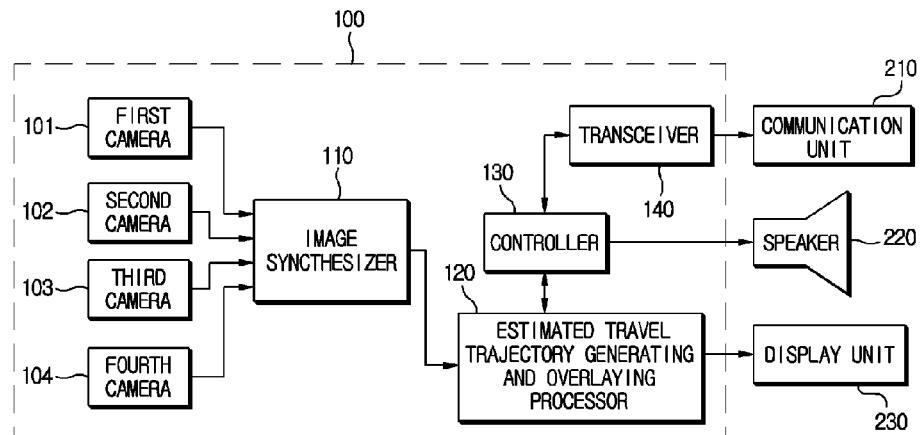
FIG. 1 is a block diagram illustrating a parking camera system according to the present invention.
Figure 2:
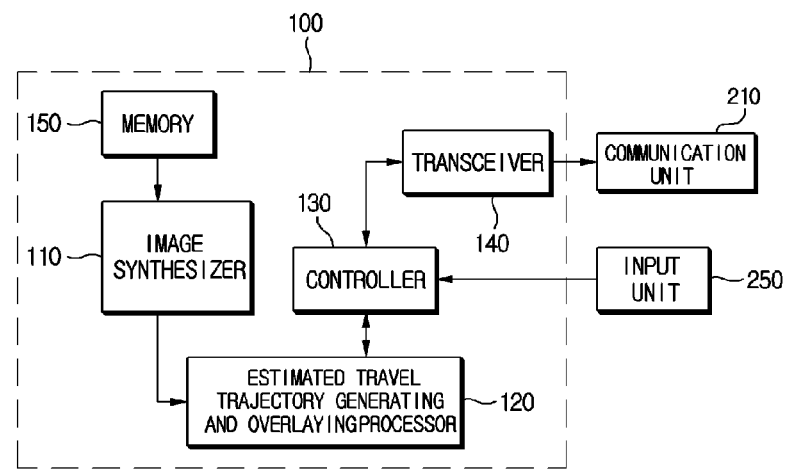
FIG. 2 is a block diagram illustrating constituent elements that may be added to a parking camera system according to an exemplary embodiment of the present invention.

FIG. 1 is a block diagram illustrating a parking camera system according to the present invention, and FIG. 2 is a block diagram illustrating constituent elements that may be added to a parking camera system according to an exemplary embodiment of the present invention.

A parking camera system (100) according to the present invention includes a plurality of cameras (101, 102, 103, 104) equipped with a vehicle, an image synthesizer (110) for synthesizing images photographed by the plurality of cameras (101, 102, 103, 104) equipped with the vehicle, and an estimated travel trajectory generating and overlaying processor (120) for generating an estimated travel trajectory of the vehicle by receiving steering angle information of the vehicle, and synthesizing the estimated travel trajectory of the vehicle with the images synthesized by the image synthesizer (110).

The plurality of cameras (101, 102, 103, 104) equipped with the vehicle includes a first camera (101) installed in front of the vehicle, a second camera (102) installed at a rear of the vehicle, a third camera (103) installed at a left side of the vehicle, and a fourth camera (104) installed at a right side of the vehicle. That is, the plurality of cameras (101, 102, 103, 104) is equipped with the vehicle to capture substantially all-around views of the vehicle. Therefore, the parking camera system (100) according to the present invention is operated in such a fashion that images photographed by the plurality of cameras (101, 102, 103, 104) are synthesized by the image synthesizer (110), the estimated travel trajectory generating and overlay processor (120) receives steering angle information of the vehicle that changes in response to adjustment of steering wheel by a driver to generate an estimated travel trajectory, and synthesizes the image synthesized by the image synthesizer (110) with the estimated travel trajectory for utilization in parking the vehicle.

Furthermore, the estimated travel trajectory generating and overlaying processor (120) may be connected to a display unit displaying an ambient image of vehicle synthesized with the estimated travel trace of the vehicle. Thus, a display unit (230) displays images of ambient conditions of vehicle synthesized with the estimated travel trajectory, and the driver of the vehicle mounted with parking camera system can advantageously view substantially all-around images of the vehicle, whereby the driver can recognize an obstacle present in front of the vehicle during parking of the vehicle, and perform an accurate parking while viewing the estimated travel trajectory of the vehicle.

Furthermore, a controller (130) can receive steering angle information of the vehicle in real time through CAN (Controller Area Network) communication with an external communication unit (210) and via a transceiver unit (140), and can also receive vehicle speed information. The communication unit (210) may be configured to directly receive steering angle information from a steering angle measuring device included with a steering angle sensor. The communication unit (210) may be also configured to receive the steering angle information from an equivalent device equipped with the vehicle capable of receiving the steering angle information. At this time, the steering angle sensor measures a steering degree of steering wheel necessary for controlling a travelling vehicle.

The estimated travel trajectory generating and overlaying processor (120) generates the estimated travel trajectory of the vehicle using the steering angle information received from the controller (130).

Referring to FIG. 2, the parking camera system (100) according to the present invention may further include a memory (150) stored with a parking guide line of the vehicle, a parking area image and a vehicle image. The image synthesizer (110) may synthesize at least one or more of the parking guide line, the parking area image and vehicle image stored in the memory (150) with images photographed by the cameras.

Although not described in the figure, the estimated travel trajectory generating and overlaying processor (120) may synthesize at least one or more of the parking guide line, the parking area image and vehicle image stored in the memory (150) with images photographed by the cameras and the estimated travel trajectory.

At this time, the memory (150) may be a flash memory, and may be further stored with images including, but not limited to a parking mode, a parking direction and a warning phase. The parking guide line in the images may be stored with various images in response to the parking mode (parallel parking, right angle parking) and the parking direction (left direction or right direction).

Meanwhile, the controller (130) may be configured to output a warning sound to a speaker (220) for the driver to recognize a time when the estimated travel trajectory of vehicle matches the parking guide line and a time when the estimated travel trajectory does not match the parking guide line, as illustrated in FIG. 1.

Furthermore, the parking camera system (100) according to the present invention may further include an input unit (250) capable of allowing the driver to select and input a parking mode including a parallel parking or a right angle parking. Still furthermore, an input signal selected by the input unit (250) is inputted to the controller (130), which in turn outputs to the image synthesizer (110) the parking guide line and the image of the parking area stored in the memory (150) according to the parking mode of the selected input signal.

Therefore, the parking camera system (100) according to the present invention is operated in such a manner that if an estimated travel trajectory of the vehicle deviates from the parking guide line and the parking area of the vehicle, the driver adjusts the steering wheel to prevent the vehicle from deviating from the parking guide line and the parking area of the vehicle, thereby reducing inconveniences and time loss resultant from parking failure.

Furthermore, the parking camera system (100) according to the present invention can advantageously recognize an estimated travel trajectory of the vehicle to prevent the vehicle from creating a fender bender with a parked vehicle.

Figure 3:
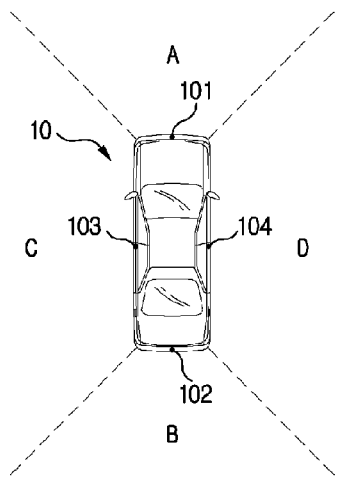
FIG. 3 is a mimetic diagram illustrating synthesis of images photographed by cameras of a parking camera system according to the present invention.
Figure 4:
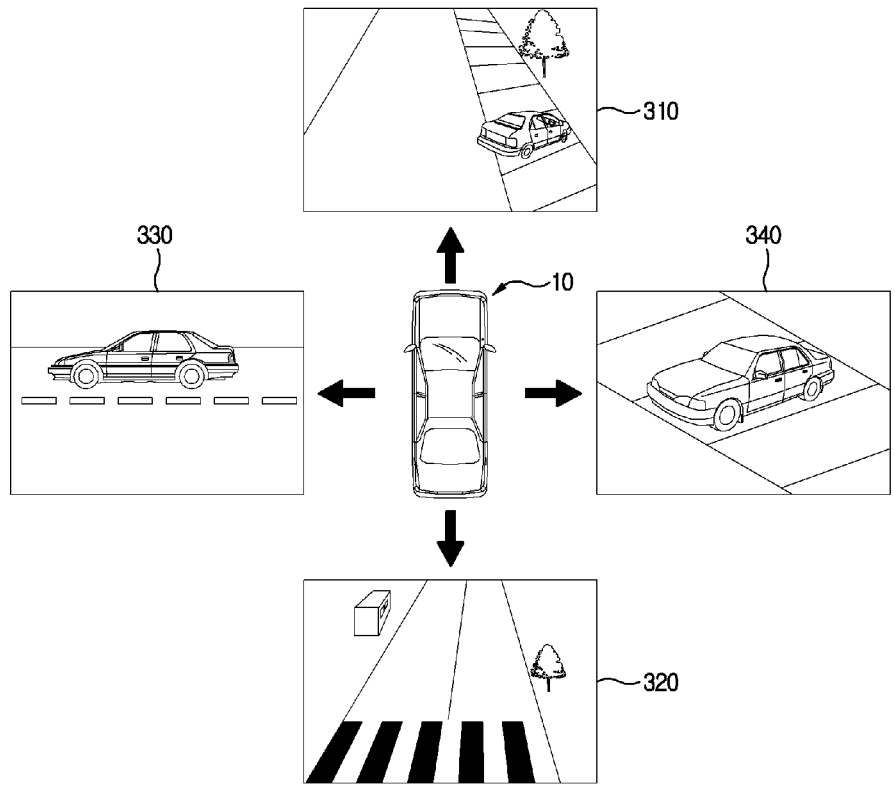
FIG. 4 is a schematic view illustrating an example where images photographed by cameras of parking camera system according to an exemplary embodiment of the present invention are synthesized and displayed on a display unit.

FIG. 3 is a mimetic diagram illustrating synthesis of images photographed by cameras of a parking camera system according to the present invention, and FIG. 4 is a schematic view illustrating an example where images photographed by cameras of parking camera system according to an exemplary embodiment of the present invention are synthesized and displayed on a display unit.

A plurality of cameras is equipped with a vehicle to capture all-around views of the vehicle. At this time, the plurality of cameras preferably includes a first camera (101) installed in front of the vehicle, a second camera (102) installed at a rear of the vehicle, a third camera (103) installed at a left side of the vehicle, and a fourth camera (104) installed at a right side of the vehicle, where the first camera (101) captures a front image of the vehicle, the second camera (102) captures a rear image of the vehicle, the third camera (103) captures an image of the left side of the vehicle, and the fourth camera (104) captures an image of the right side of the vehicle.

Thus, the images photographed by the plurality of cameras (101, 102, 103, 104) are synthesized as mentioned above. For example, the image photographed by the first camera (101) is positioned at a front side (A) of a vehicle image about the vehicle image, and the image photographed by the second camera (102) is positioned at a rear side (B) of the vehicle image. Then, the image photographed by the third camera (103) is positioned at a left side (C) of the vehicle image about the vehicle image, and the image photographed by the fourth camera (104) is positioned at a right side (D) of the vehicle image. Thereafter, the four images are synthesized. As a result, the images photographed by the first to fourth cameras (101, 102, 103, 104) are synthesized to be displayed on the display unit, as illustrated in FIG. 4.

That is, because an image (310) captured from a front side of a vehicle image (10), an image (320) captured from a rear side of the vehicle image (10), an image (330) captured from a left side of the vehicle image (10), and an image (340) captured from a right side of the vehicle image (10) are positioned at each relevant position based on the vehicle image (10), the driver can immediately check the vehicle images (10) of front, rear, left and right sides from the display unit, thereby overcoming an obstacle during parking and performing a safe parking. Furthermore, if the driver selects an image photographed from a particular direction, the display unit may display only the image of particular direction.

Figure 5:
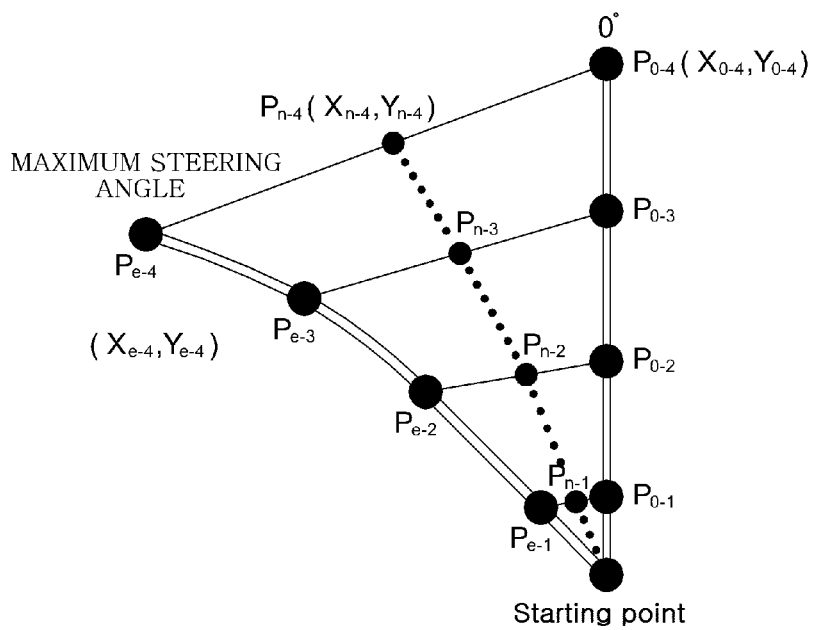
FIG. 5 is a conceptual diagram illustrating a method calculating an estimated travel trajectory of a parking camera system according to an exemplary embodiment of the present invention.

FIG. 5 is a conceptual diagram illustrating a method calculating an estimated travel trajectory of a parking camera system according to an exemplary embodiment of the present invention.

The estimated travel trajectory of vehicle generates a plurality of coordinates inside a travel trajectory based on a maximum steering angle (e.g., 540° or 720°) in consideration of vehicular characteristic when the cameras are turned on, a travel trajectory (a travel trajectory when the steering wheel is maximally rotated) and a travel trajectory of a minimum steering angle (a linear travel trajectory when the steering wheel is not rotated).

In a non-limiting example, in a case the driver rotates the steering wheel to a predetermined steering angle between the maximum steering angle and the minimum steering angle, coordinates of 'Pn-1', 'Pn-2', 'Pn-3' and 'Pn-4' may be calculated in response to the predetermined steering angle, and dotted lines connecting the coordinates become the estimated travel trajectory of the vehicle.

At this time, the communication unit may be configured by directly receiving steering angle information from a steering angle measurement device included with a steering angle sensor, or may be alternatively configured by receiving the steering angle information from an equivalent device equipped with the vehicle capable of receiving the steering angle information. The steering angle sensor measures a steering degree of the steering wheel necessary for control of the traveling vehicle.

Thereafter, a transceiver of the parking camera system according to the present invention transmits the steering angle information to the controller by receiving the steering angle information of the vehicle in real time through CAN (Controller Area Network) communication from the communication unit, and the estimated travel trajectory and overlaying processor calculates coordinates in proportion to a travel trajectory of the maximum steering angle using the steering angle information received from the controller, connects each coordinates and generates the estimated travel trajectory of the vehicle.

To be more specific, x coordinate and y coordinate of the estimated travel trajectory may be respectively determined by the following Equations, where a parking end point of four points is exemplified.

$$x_{n-4} = x_{0-4} - \Delta x \qquad \text{[Equation 1]}$$

$$y_{n-4} = y_{0-4} - \Delta y \qquad \text{[Equation 2]}$$

At this time, the variable ($\Delta x$) of x coordinate is $(x_{0-4} - x_{e-4})/(\theta c/\theta_m)$' the variable ($\Delta y$) of y coordinate is $(y_{0-4} - y_{e-4})/(\theta c/\theta_m)$' where $\theta_m$ is a maximum steering angle, and $\theta_c$ is a current steering angle.

Figure 6:
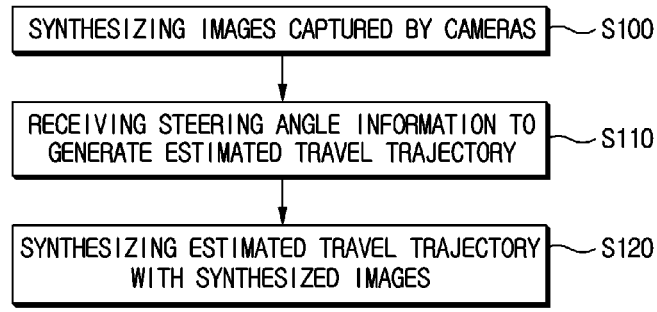
FIG. 6 is a flowchart illustrating a method of driving a parking camera system according to an exemplary embodiment of the present invention.

FIG. 6 is a flowchart illustrating a method of driving a parking camera system according to an exemplary embodiment of the present invention.

First, images photographed by a plurality of cameras equipped with a vehicle is synthesized (S100) in the method of driving a parking camera system according to the present invention. Next, steering angle information of the vehicle is received to generate an estimated travel trajectory (S110). The synthesized images are synthesized with the estimated travel trajectory (S120), where the synthesized images may substantially realize images of all-around views of the vehicle based on positions of the plurality of cameras equipped with the vehicle. Thereafter, a step of displaying the synthesized images and images synthesized with the estimated travel trajectory on the display unit may be further included.

Figure 7:
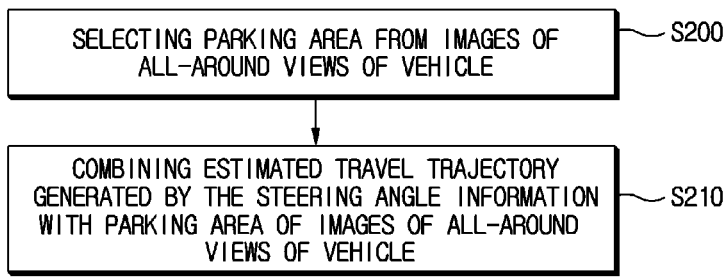
FIG. 7 is a flowchart illustrating a method of driving a parking camera system according to another exemplary embodiment of the present invention.

FIG. 7 is a flowchart illustrating a method of driving a parking camera system according to another exemplary embodiment of the present invention.

First, a parking area is selected of images of all-around views of vehicle in the method of driving a parking camera system according to another exemplary embodiment of the present invention (S200), where images of all-around views of vehicle are made by images synthesized with images photographed by the plurality of cameras equipped with the vehicle, and are substantially images of all-around views of the vehicle.

Successively, the estimated travel trajectory of vehicle generated by the steering angle information of the vehicle is combined with the parking area with images of all-around views of the vehicle, where the estimated travel trajectory of the vehicle is displayed by being combined with the parking area with images of all-around views of vehicle, and the parking area may be an actual parking area, or a parking area image overlapped on the actual parking area.

Furthermore, a step of selecting a parking mode from the images of all-around views of vehicle is further included prior to the step 'S200' where the step of 'S200' may be configured by selecting the parking area based on the selected parking mode.

The parking mode includes a parallel parking and a right angle parking, and the selected parking mode is preferably one of the parallel parking and the right angle parking.

In case the parking area is selected in the Step 'S200' the selected parking area may be combined with parking guide line information. Therefore, the parking area may be displayed with the parking guide line information and the estimated travel trajectory of vehicle based on the selected parking mode, in case the driver selects a parking area on which the vehicle is to be parked.

At this time, the parking guide line and the parking area are stored images combined by the images, and may be provided in fixed images. At this time, in a case the parking area does not match an actual parking area, the vehicle may be driven forward or driven reversely to match the parking area with the actual parking area.

Furthermore, the estimated travel trajectory of the vehicle may be displayed on the display unit in the form of a polygon or a direction indication. In order to display the estimated travel trajectory of the vehicle, the shape of polygon is preferably displayed in the shape of a trapezoid for providing a prospective, and the shape of a direction indication is preferably displayed in the shape of an arrow. However, the shape of the estimated travel trajectory is not limited to the abovementioned shapes, and other various shapes may be displayed.

The estimated travel trajectory of the vehicle is changed and displayed in real time on the display unit based on the changing steering angle of the vehicle, whereby the driver can adjust the steering wheel for accurate parking. For example, changed estimated travel trajectories may be displayed on the display unit whenever the steering angle of the vehicle changes more than 20°.

Thus, the driver changes the estimated travel trajectory in response to manipulation of the steering wheel to match the vehicle to the parking guide line, and in a case the estimated travel trajectory matches the parking guide line, the driver can park the vehicle without manipulation of steering wheel.

Therefore, there is an advantage in the present invention that the driver can easily park a vehicle by matching the estimated travel trajectory to the parking guide line. At this time, in a case the estimated travel trajectory matches the parking guide line, the driver is made to recognize that parking is possible, by outputting the estimated travel trajectory in different color. The detailed color may be variably changed based on driver preference and specification of display. That is, colors of the estimated travel trajectories of vehicle may be differently set up, in a case the estimated travel trajectory matches the parking guide line and in a case the estimated travel trajectory does not match the parking guide line.

In a non-limiting example, in a case the estimated travel trajectory does not match the parking guide line, the estimated travel trajectory may be displayed in blue color which is a first color, and in a case the estimated travel trajectory matches the parking guide line, the estimated travel trajectory may be displayed in green color which is a second color.

Mode for the Invention

Figure 8:
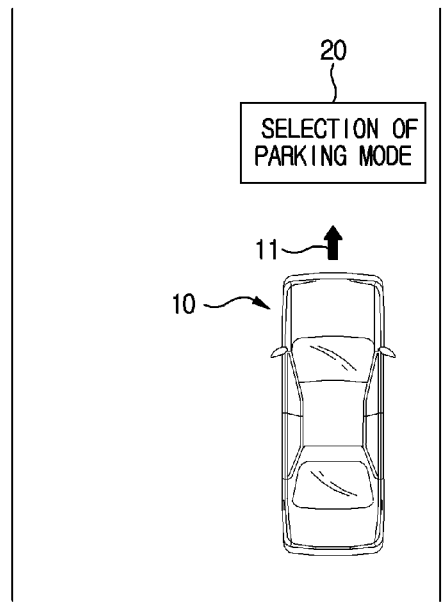
FIG. 8 is a schematic view illustrating a screen of a display unit selecting a parking mode in a method of driving a parking camera system according to an exemplary embodiment of the present invention.
Figure 9A:
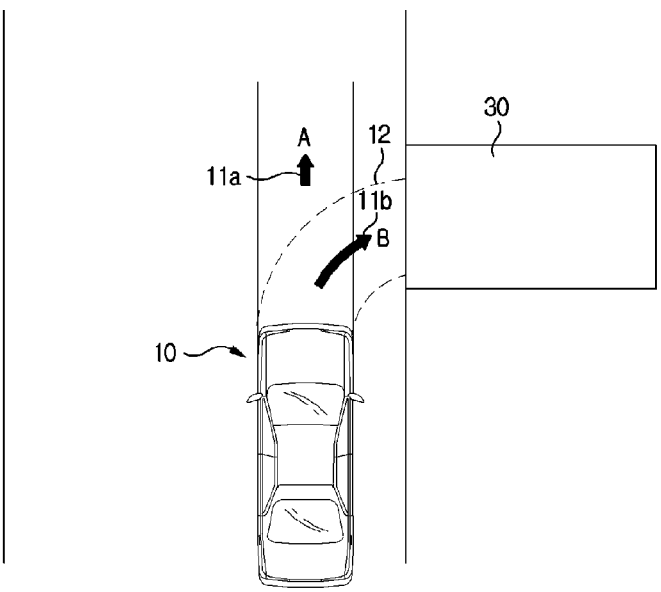
FIGS. 9*a* and 9*b* are schematic views illustrating a screen of a display unit displaying an estimated travel trajectory of a vehicle in a parking area under a parking mode of a method of driving a parking camera system according to an exemplary embodiment of the present invention.
Figure 9B:
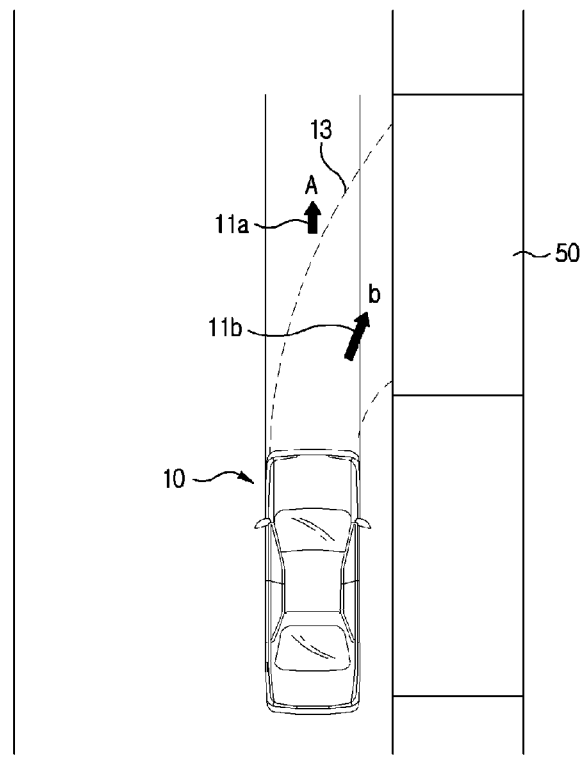

FIG. 8 is a schematic view illustrating a screen of a display unit selecting a parking mode in a method of driving a parking camera system according to an exemplary embodiment of the present invention, and FIGS. 9a and 9b are schematic views illustrating a screen of a display unit displaying an estimated travel trajectory of a vehicle in a parking area under a parking mode of a method of driving a parking camera system according to an exemplary embodiment of the present invention.

For reference, FIG. 8 and FIGS. 9a and 9b are exemplary figures for explaining a method of driving a parking camera system according to the present invention, and therefore, explanation of the method is not restricted to the given figures.

First, in a case the driver parks the vehicle in the parking camera system, an image capable of selecting a parking mode is outputted to the display unit, where the display unit displays a screen included with a parking mode selection icon (20) as shown in FIG. 8, where an arrow '11' shows a direction right before the current point of the vehicle.

Furthermore, FIG. 9a shows a selected parking mode being a right angle parking, and FIG. 9b shows a selected parking mode being a parallel parking, where, in a case the driver manipulates the steering wheel to parking areas (30, 50) selected from respective parking modes, estimated travel trajectories (12, 13) are displayed on a screen of the display unit.

At this time, the screen of the display unit may be displayed with an 'A' direction (11a) progressed by the vehicle right before the current point, and a 'B' direction (11b) of the estimated travel trajectory by the steering angle in response to the manipulation of the steering wheel by the driver, and the vehicle is so displayed that it will progress from the A direction (11a) to the B direction. Furthermore, the vehicle is displayed on the screen of the display unit as a vehicle image.

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

INDUSTRIAL APPLICABILITY

The present invention has an industrial applicability in that a driver can view images of substantially all-around views of a vehicle to enable the driver to recognize an obstructive object present in front of a vehicle during vehicle parking, and perform an accurate parking while viewing an estimated travel trajectory of the vehicle.

The invention claimed is:

1. A parking camera system, the system including:
a plurality of cameras equipped with a vehicle;
an image synthesizer for synthesizing images photographed by the plurality of cameras;
a memory storing a parking guide line of the vehicle, a parking area image and a vehicle image;
an input unit allowing the driver to select and input a parking mode including a parallel parking or a right angle parking; and
an estimated travel trajectory generating and overlaying processor for generating an estimated travel trajectory of the vehicle by receiving steering angle information of the vehicle, and synthesizing the estimated travel trajectory of the vehicle with the images synthesized by the image synthesizer,
wherein the memory outputs to the image synthesizer the parking guide line or the parking area image according to the selected parking mode, and
wherein the image synthesizer synthesizes at least one or more of the parking guide line, the parking area image and the vehicle image with images photographed by the cameras.

2. The parking camera system of claim 1, wherein the plurality of cameras includes a first camera installed in front of the vehicle, a second camera installed at a rear of the vehicle, a third camera installed at a left side of the vehicle, and a fourth camera installed at a right side of the vehicle.

3. The parking camera system of claim 1, further including a memory stored with a parking guide line of the vehicle, a parking area image and a vehicle image.

4. The parking camera system of claim 3, wherein the memory is further stored with a parking mode image, a parking direction image and a warning phrase image.

5. The parking camera system of claim 3, wherein the image synthesizer synthesizes at least one or more of the parking guide line, the parking area image and vehicle image stored in the memory with images photographed by the cameras.

6. The parking camera system of claim 2, wherein the estimated travel trajectory generating and overlaying processor is connected to a display unit displaying an ambient image of vehicle synthesized with the estimated travel trace of the vehicle.

7. The parking camera system of claim 6, wherein the ambient images of vehicle synthesized with the estimated travel trajectory of the vehicle are displayed about the vehicle image on the display unit,
wherein an image photographed by the first camera is positioned at the front of the vehicle image, an image photographed by the second camera is positioned at the rear of the vehicle image, an image photographed by the third camera is positioned at the left side of the vehicle image, and an image photographed by the fourth camera is positioned at the right side of the vehicle image.

8. The parking camera system of claim 1, wherein the estimated travel trajectory of the vehicle is displayed on the display unit in the form of a polygon or a direction indication.

9. The parking camera system of claim 8, wherein the estimated travel trajectory is displayed on the display unit changed in real time in response to change of a steering angle of vehicle.

10. The parking camera system of claim 1, wherein the estimated travel trajectory generating and overlaying processor is such that the steering wheel of the vehicle calculates coordinates turned to a predetermined steering angle between a maximum steering angle and a minimum steering angle, and dotted lines connecting the coordinates generate the estimated travel trajectory of the vehicle.

11. A method of driving a parking camera system, the method including:
- synthesizing images photographed by a plurality of cameras equipped with a vehicle;
- generating an estimated travel trajectory of the vehicle by receiving steering angle information of the vehicle;
- selecting a parking mode including a parallel parking or a right angle parking;
- outputting to an image synthesizer a parking guide line or a parking area image according to the selected parking mode; and
- synthesizing at least one or more of the estimated travel trajectory, the parking guide line, the parking area image and a vehicle image with images photographed by the cameras.

12. The method of driving a parking camera system of claim 11, further including displaying the synthesized images and an image synthesized with the estimated travel trajectory on a display unit, after the step of synthesizing the estimated travel trajectory with the synthesized images.

13. The method of driving a parking camera system of claim 12, wherein the estimated travel trajectory of the vehicle is displayed on the display unit by being changed in real time in response to change of a steering angle of vehicle.

14. The method of driving a parking camera system of claim 11, wherein the images synthesized with images photographed by the plurality of cameras are images of substantially all-around views.

15. A method of driving a parking camera system, the method including:
- selecting a parking image from images of all-around views of a vehicle;
- combining an estimated travel trajectory of a vehicle generated by steering angle information of the vehicle with a parking area of the all-around views of the vehicle;
- selecting a parking mode including a parallel parking or a right angle parking;
- outputting to an image synthesizer a parking guide line or a parking area image according to the selected parking mode; and
- synthesizing at least one or more of the estimated travel trajectory, the parking guide line, the parking area image and a vehicle image with images photographed by the cameras.

16. The method of driving a parking camera system of claim 15, wherein the all-around views of the vehicle are made by synthesizing images photographed by a plurality of cameras equipped with the vehicle and are substantially all-around views of the vehicle.

17. The method of driving a parking camera system of claim 15, wherein the parking mode includes a parallel parking and a right angle parking.

18. The method of driving a parking camera system of claim 15, wherein the selected parking area is combined with parking guide line information, in case the parking area is selected.

19. The method of driving a parking camera system of claim 18, wherein colors of estimated travel trajectory of vehicle are different, when the estimated travel trajectory matches the parking guide line and when the estimated travel trajectory does not match the parking guide line.

* * * * *